US009674205B2

(12) United States Patent
Kirkham et al.

(10) Patent No.: US 9,674,205 B2
(45) Date of Patent: *Jun. 6, 2017

(54) IDENTITY AND TRUSTWORTHINESS VERIFICATION USING ONLINE AND OFFLINE COMPONENTS

(71) Applicant: AIRBNB, INC., San Francisco, CA (US)

(72) Inventors: Stephen Kirkham, San Francisco, CA (US); Michael Lewis, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/043,710

(22) Filed: Feb. 15, 2016

(65) Prior Publication Data

US 2016/0164885 A1  Jun. 9, 2016

Related U.S. Application Data

(63) Continuation of application No. 14/175,180, filed on Feb. 7, 2014, now Pat. No. 9,288,217.

(60) Provisional application No. 61/910,756, filed on Dec. 2, 2013.

(51) Int. Cl.
*G06F 7/04* (2006.01)
*G06F 15/16* (2006.01)
*H04L 29/06* (2006.01)
*G06F 21/31* (2013.01)

(52) U.S. Cl.
CPC .......... *H04L 63/126* (2013.01); *G06F 21/31* (2013.01)

(58) Field of Classification Search
CPC .................................................. H04L 63/126
USPC ........................................................ 726/1, 2, 3
See application file for complete search history.

(56) References Cited

U.S. PATENT DOCUMENTS

| 8,069,467 | B1* | 11/2011 | Ogilvie | H04L 67/10 |
| | | | | 713/182 |
| 8,875,267 | B1* | 10/2014 | Kolman | G06F 21/31 |
| | | | | 709/203 |
| 2006/0053480 | A1* | 3/2006 | Lacasse | G06F 21/35 |
| | | | | 726/2 |
| 2006/0072822 | A1 | 4/2006 | Hatzac et al. | |
| 2009/0228294 | A1 | 9/2009 | Choi et al. | |
| 2009/0249445 | A1* | 10/2009 | Deshpande | G06F 17/30887 |
| | | | | 726/3 |
| 2010/0131589 | A1 | 5/2010 | Lawyer et al. | |

(Continued)

OTHER PUBLICATIONS

PCT International Search Report and Written Opinion, PCT Application No. PCT/US14/67884, Mar. 3, 2015, 21 pages.

(Continued)

*Primary Examiner* — Taghi Arani
*Assistant Examiner* — Khalil Naghdali
(74) *Attorney, Agent, or Firm* — Fenwick & West LLP

(57) ABSTRACT

Methods and systems for verifying the identity and trustworthiness of a user of an online system are disclosed. In one embodiment, the method comprises receiving online and offline identity information for a user and comparing them to a user profile information provided by the user. Furthermore, the user's online activity in a third party online system and the user's offline activity are received. Based on the online activity and the offline activity a trustworthiness score may be calculated.

20 Claims, 4 Drawing Sheets

(56) References Cited

U.S. PATENT DOCUMENTS

| | | | |
|---|---|---|---|
| 2010/0330960 A1* | 12/2010 | Ravishankar | H04M 3/2281 455/410 |
| 2011/0246764 A1* | 10/2011 | Gamez | G06F 21/41 713/155 |
| 2012/0144461 A1* | 6/2012 | Rathbun | H04L 9/3213 726/5 |
| 2012/0239940 A1* | 9/2012 | Chabanne | G06F 21/32 713/186 |
| 2013/0060809 A1 | 3/2013 | Drubner | |
| 2013/0103686 A1* | 4/2013 | Sisneros | G06F 17/30867 707/736 |
| 2013/0133048 A1 | 5/2013 | Wyn-Harris | |
| 2013/0191898 A1 | 7/2013 | Kraft | |
| 2014/0007191 A1* | 1/2014 | Hu | G06F 21/6245 726/3 |

OTHER PUBLICATIONS

United States Office Action, U.S. Appl. No. 14/175,180, Mar. 12, 2015, 27 pages.

* cited by examiner

IDENTITY AND TRUSTWORTHINESS VERIFICATION USING ONLINE AND OFFLINE COMPONENTS

CROSS REFERENCE TO RELATED APPLICATIONS

This application is a continuation of U.S. application Ser. No. 14/175,180, filed Feb. 7, 2014, which claims the benefit of U.S. Provisional Application No. 61/910,756, filed Dec. 2, 2013, both of which are incorporated by reference in their entirety.

TECHNICAL FIELD

This invention relates to verifying the identity and trustworthiness of a user of an online system using online and offline components.

BACKGROUND ART

"On the Internet, nobody knows you're a dog." Famously stated by cartoonist Peter Steiner in 1993, this adage is still true today: in the online world, who you are may not necessarily be who you say you are. Users may create fake identities or may try to impersonate someone they are not. For example, there are many accounts of users creating a social networking account impersonating a famous artist, celebrity or politician. Users impersonating another person may use readily available information such as name, date or birth, marital status, and the like of the person they are trying to impersonate. A user impersonating another may also include pictures of the other person in their accounts to further maintain the illusion.

Similarly, users may create a fake identity, with a fake name, fake date of birth, fake address and the like. These users may also create multiple online accounts using this fake identity, such as a blog account, an email address account, a social networking system account and the like. The existence of such fake accounts themselves is often relied upon as "evidence" that the identity is real, thereby enabling the user to open further fake accounts, with other websites and businesses.

Some online systems need to verify the identity of the user creating the user account. For instance, those offering goods and services for sale through online systems generally must assume that users requesting those goods or service are real people. This is particularly the case in those online systems in which transactions begin in the online and end in the offline activities by the parties. For example, accommodation reservation systems may allow guests to search for, ask about, and book accommodations offered by host users. That is, the transaction starts at the accommodation reservation system and end with the user staying at the host user's property. The host would prefer to have a way to verify the identity of the guest. Similarly, in a ride sharing system, a rider makes an online request for a ride offered by a driver; the driver would prefer have a way to verify the identity of the rider.

Furthermore, even once the identity of a user is confirmed, those users offering accommodation or a rideshare may also want to know how trustworthy is the user asking for accommodation or a rideshare is. In addition, being able to determine whether users asking for accommodation or a rideshare and determine the trustworthiness of the same may encourage some people to offer accommodation or a rideshare to other people.

SUMMARY

An online system is configured to determine the veracity of the identity and the trustworthiness of a user based on a combination of both online and offline information. In one embodiment, the online information includes information available in the online system, as well as information provided by third party online systems. Offline information may include government issued identifications (such as driver license or passport), credit history, education history, criminal databases and the like.

The online system can determine the veracity of the identity of a user by comparing the information provided by the user to information available in third party online systems (e.g., social networking systems, email servers, blogs, etc) and information included in a government issued identification. In some embodiments, the first name, last name, date of birth and/or picture of the user can be used to determine the veracity of the user's identity.

The online system can then determine the trustworthiness of the user by analyzing the user's behavior in the online system, third party online systems and offline databases. In one embodiment, a trustworthiness score can be determined based on the online and offline information available about the user.

The identity verification may be performed, for example, during the creation of a user profile to determine whether to allow the user to create a user profile or not. The trustworthiness verification may be performed in a regular basis (e.g., every 6 months) or every time the user performs a transaction in the online system. The trustworthiness score may be, for example, shown to other users of the online system that would like to interact or perform transactions with the user. Alternatively, the trustworthiness score may be used internally as a risk signal by the online system.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
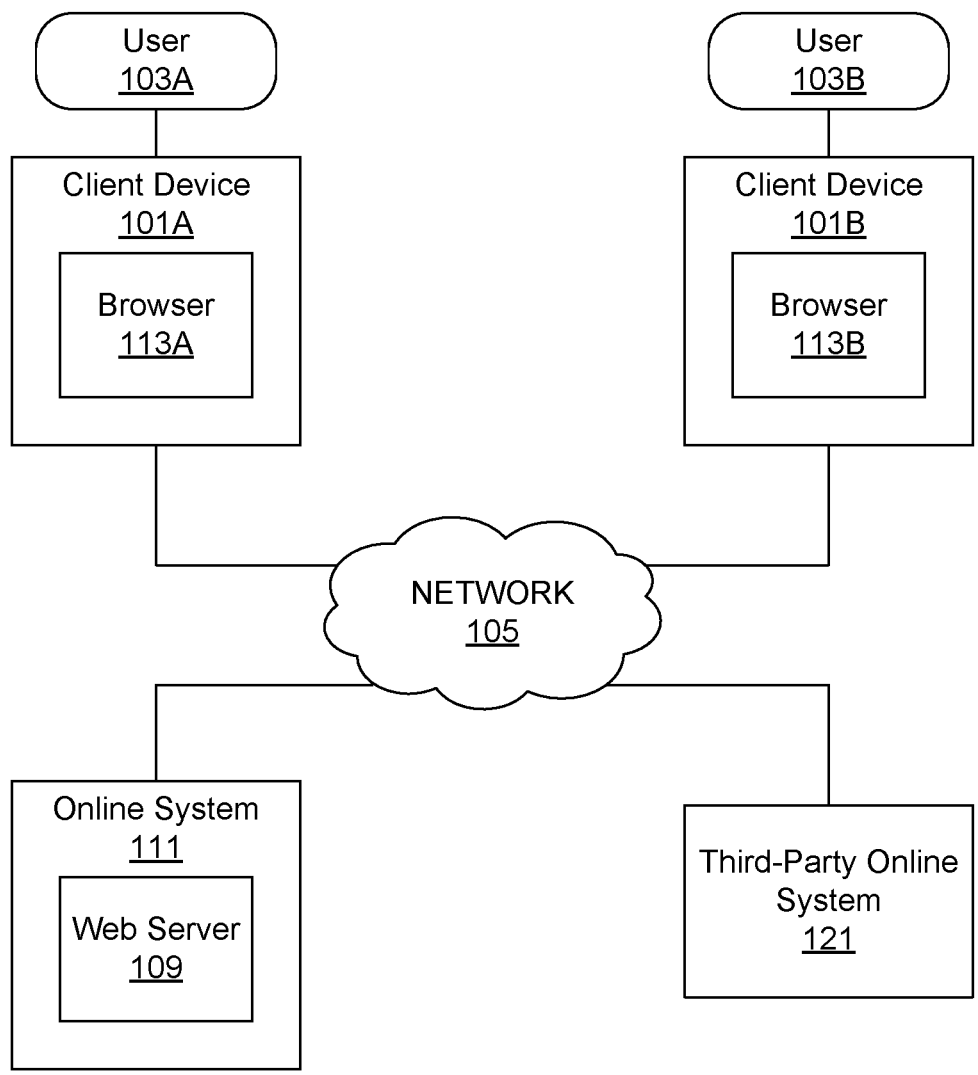
FIG. 1 is a system diagram of an online system, in accordance with an embodiment of the invention.

Referring now to FIG. 1, there is shown the system architecture adapted to support one embodiment of the present invention. FIG. 1 and the other figures use like reference numerals to identify like elements. A letter after a reference numeral, such as "113A," indicates that the text refers specifically to the element having that particular reference numeral. A reference numeral in the text without a following letter, such as "113," refers to any or all of the elements in the figures bearing that reference numeral (e.g. "113" in the text refers to reference numerals "113A" and/or "113B" in the figures).

The network 105 represents the communication pathways between users 103 and the online system 111. In one embodiment, the network is the Internet. The network can also utilize dedicated or private communication links (e.g. WAN, MAN, or LAN) that are not necessarily part of the Internet. The network uses standard communications technologies and/or protocols.

The web server 109 presents web pages or other web content, which form the basic interface to the users 103. Users 103 use respective client devices 101 to access one or more web pages, and provide data to the online system 111.

The third party online system 121 communicates with the online system 111 and may also be any type of online system in which users can create user profile accounts. For example, the third party-online system 121 may be an email provider, a social networking system, an online retail system, a banking system, financial management system, and the like. In some embodiments, the online system 111 may communicate with one than on third party online service 121.

In one embodiment, the client devices 101 are used by the users for interacting with the online system 111. A client device 101 can be any device that is or incorporates a computer such as a personal computer (PC), a desktop computer, a laptop computer, a notebook, a smartphone, or the like. A computer is a device having one or more general or special purpose processors, memory, storage, and networking components (either wired or wireless). The device executes an operating system, for example, a Microsoft Windows-compatible operating system (OS), Apple OS X or iOS, a Linux distribution, or Google's Android OS. In some embodiments, the client device 101 may use a web browser 113, such as Microsoft Internet Explorer, Mozilla Firefox, Google Chrome, Apple Safari and/or Opera, as an interface to interact with the online system 111.

The online system 111 may be for example an accommodation reservation system, a rideshare reservation system, an email system, a social networking system, an online retail system, banking system, financial management system, and the like. In some embodiments, the online system 111 facilitates transactions between users 103. For example, an accommodation reservation system allows users 103 to obtain accommodation provided by other users of the accommodation reservation system. A rideshare reservation system allows users 103 to obtain rides from one location to another. An online market place system allows users 103 to buy and/or sell products or services to other users. The online system 111 comprises additional components and modules that are described below.

Figure 2:
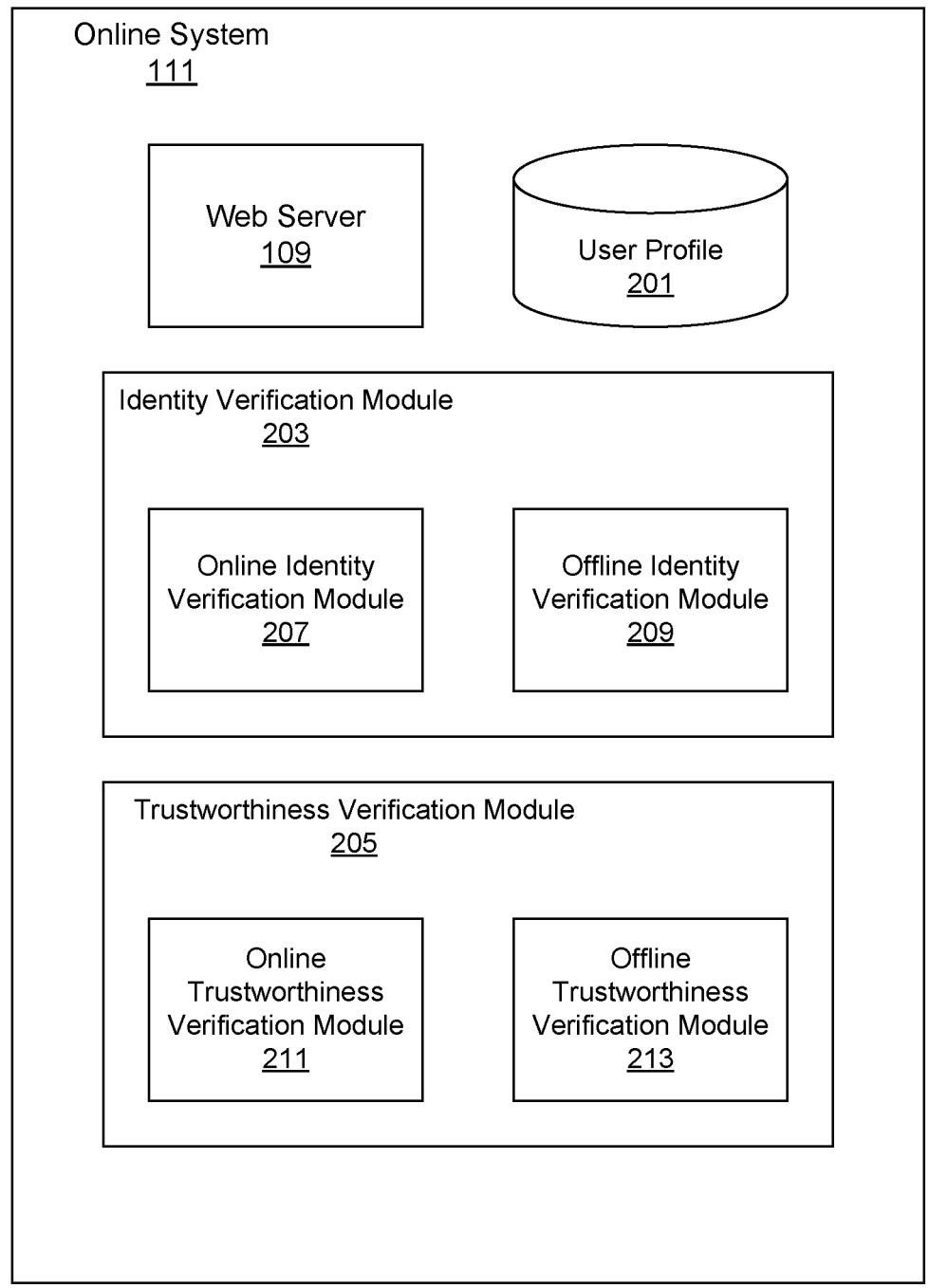
FIG. 2 is a block diagram illustrating the different modules inside the online system, in accordance with an embodiment of the invention.

Referring to FIG. 2, in one embodiment the online system 111 comprises a user profile database 201, an identity verification module 215 and a trustworthiness verification module 221. Those of skill in the art will appreciate that the online system 111 will contain other modules appropriate for its functionality (e.g., social networking, banking, commerce, etc.), but that are not described herein, since they are not directly material to the invention. In addition, conventional elements, such as firewalls, authentication systems, payment processing systems, network management tools, load balancers, and so forth are not shown as they are not material to the invention. The online system 111 may be implemented using a single computer, or a network of computers, including cloud-based computer implementations. The computers are preferably server class computers including one or more high-performance CPUs and 1 G or more of main memory, and running an operating system such as LINUX or variants thereof. The operations of the system 111 as described herein can be controlled through either hardware or through computer programs installed in non-transitory computer storage and executed by the processors to perform the functions described herein. The various stores (e.g., user profile 201, etc.) are implemented using non-transitory computer readable storage devices, and suitable database management systems for data access and retrieval. The online system 111 includes other hardware elements necessary for the operations described here, including network interfaces and protocols, input devices for data entry, and output devices for display, printing, or other presentations of data.

Each user of the online system 111 is associated with a user profile, which is stored in the user profile database 201; the database 201 is implemented in a database management system, such as a relational database (e.g., MySQL). A user profile includes personally identifying information about the user that was explicitly provided by the user, and may also include profile information inferred by the online system 111. A user profile includes multiple data fields, each data field describing one or more attributes of the corresponding user of the online system 111. Examples of information stored in a user profile include biographic (e.g., name, date of birth, home address), demographic, and other types of descriptive information, such as work experience, education history, gender, telephone numbers, email address, and the like. A user profile in the user profile store 201 may also maintain references to actions by the corresponding user performed in the online system 111, such as transactions made, pages visited, and so forth. In one embodiment, the online system 111 allows users to use their user profile from a third party online system in the online system (e.g., by using a third party application programming interface (API) such as Facebook Connect). In this embodiment, the online system may not maintain its own user profile store 201, but instead, it may use the information contained in the third party user profile store.

Identity Verification

The identity verification module 203 verifies the veracity of the user profile information provided by a user of the online system 111, and is one means for performing this function. The identity verification module 203 may be configured to only verify whether the name of the user creating an account is correct. Alternatively, the identity verification module may be configured to verify the veracity of other information such as the date of birth of the user, address of the user, image of the user, etc.

In one embodiment, the identity verification module 203 determines the veracity of a user profile information and provides a binary result (e.g., either verified or unverified). In other embodiments, the identity verification module may determine an identity verification score based on the information available. The identity verification score may, for example, represent the level of confidence that the user profile information provided by the user is correct, on a predetermined scale, e.g., zero up to a maximum value (e.g., from 0 to 1), where 0 represents that there is no confidence that the information provided by the user is correct, and 1 represents that is perfect confidence that the information that the user provided is correct. Alternatively, the identity verification score may range from a negative value to a positive value (e.g., from −1 to +1), where −1 represents that is very likely that the information provided by the user is incorrect, 0 represents that it cannot be determined whether the information provided by the user is correct or not, and +1 represents that is very likely that the information provided by the inventor is correct.

To verify the identity of a user the identity verification module 203 may use online and offline information of the user 103. In one embodiment, the identity verification module 203 verifies the identity of a user 103 when the user is creating an account or a user profile with the online system 111. In other embodiments, the identity verification module 203 verifies the identity of a user every time the user performs a transaction with the online system 111. In yet other embodiments, the identity verification module 203 verifies the identity of a user every preset amount of time (e.g., every 5 years).

In one embodiment, the identity verification module 203 comprises the online identity verification module 207 and the offline identity verification module 209. The online identity verification module 207 determines an online identity verification score, and the offline identity verification module 209 determines an offline identity verification score. Then, the identity verification module 203 aggregates the two scores to determine an overall identity verification score.

The online identity verification module 207 uses user profile information from third party online systems 121 to determine the veracity of a user's identity. For example, the online identity verification module 207 may use third party online systems such as Facebook, Gmail, LinkedIn, Twitter, and the like. Users that create accounts in the online system 111 oftentimes also have a user account or user profile in at least one of the third party online systems 121. The online identity verification module 207 obtains from the user the user's access credential for one or more of the third party online systems 121 (e.g., the username and password) and accesses the third party online system 121 either through an exposed API or other means, logging into the user's account with the credential.

The online identity verification module 207 may be configured to only use information from third party online systems 121 user accounts that are at least a predetermined amount of time old (e.g., at least one year old) and/or from third party online systems 121 with user profile information that has not changed in at least a predetermined amount of time (e.g., that has not changed in at least one year). In this case, the module 207 queries the third party system 121 to determine the creation date of the user's account or the last modification date. If the creation date is less than one year from the current date, the third party system 121 is not used for any further for verification. If the user's account was created more than a year before the current date, then the date of last modification and the data modified is considered. Modifications to the user name, address, date of birth, telephone numbers are used considered as potential indicators of a lack of veracity. For instance, a user account that has had a recent change in the name may not be used to verify the identity of a user, since the change of name may be indicative of a user's attempt to create a false identity. In some embodiments, if a female user had a change in her last name and her marital status to married, both changes made within a threshold amount of time form each other (e.g., female user changed her last name within a month since she changed her marital status), the online identity verification module 207 may still use this information since women oftentimes change their last name after getting married. The identity verification module may then use both last names, before marriage and after marriage, as valid names for the verification of the identity of the user.

Alternatively, the online identity verification module 207 may be configured to use information from third party online systems 121 user accounts with at least a threshold amount of activity. For instance, the online identity verification module 207 may consider the frequency or the number of times the user signs into the third party online system 121, and/or the frequency or number of interactions between the user and the third party online system 121. For instance, the online identity verification module 207 may determine the frequency at which the user uploads new stories or uploads pictures into an online social networking system. If the online identity verification module 207 determines that the third party online system 121 user account does not have at least a threshold amount of activity, the online identity verification module 207 may not use the information included in the third party online system 121 since the lack of activity may indicate of a user's attempt to create a false identity.

Once the online identity verification module 207 determines that the account data from a third party online system 121 may be used, the online identity verification module 207 calculates an edit distance (e.g., a Hamming distance or a Levenshtein distance) between various fields of information provided by the user and the corresponding information available in the third party online system 121. For example, if a user specified that his first name is "James" and the user profile in the third party online system 121 says that the user's first name is "Janes," the online identity verification module 207 calculates a distance between the string "James" and the string "Janes" as 1, since only a single letter needs changing. The online identity verification module 207 uses the calculated distance to determine the online identity score.

The online identity verification module 207 may compare the name provided by the user and the name available in the third party online system 121 phonetically. For example, the online identity verification module 207 may determine that the last names "Lee" and "Li" are matching since the last names "Lee" and "Li" are phonetically equivalent. Additionally, the online identity verification module may ignore diacritics. For example, the online verification module 207 may determine that the names "Jose" and "José" are equivalent.

In some embodiments, the online identity verification module 207 may instead determine that the information provided by the user is correct only if the information provided by the user and the corresponding information available in the third party online system 121 matches. In other words, the online identity verification module 207 rejects the identity provided by the user if there is any discrepancy between the identity provided by the user and the corresponding information available in the third party online system 121.

Alternatively, the online identity verification module 207 may take into consideration all information included in a user profile, including information that have been recently modified or information from newly created user accounts, and adjust the online identity score based on the longevity of the online account and/or the amount of time since the date of last modification. For example, the online verification score for a specific online user account may be multiplied by a factor determined based on the longevity of the user account. For instance, the multiplication factor may be 1 if the user profile was created more than a year from the current data, or the number of months since the user profile was created divided by 12 if the user profile was created within the last year.

In some embodiments, instead of calculating a score, the online identity verification module 207 may compare the information from the third party online systems 121 and the information provided by the user for exact match. If the information does not match, the online identity verification module 207 may reject the identity or flag the user account as having an unverified identity.

The online identity verification module 207 determines a score for different fields of the user profile, based on the edit distance for each field (e.g., one score for the first name, one score for the last name, one score for the date of birth, etc) and aggregates them to determine an overall online identity verification score. The score for each field is weighted by a weighting factor to reflect the importance of the field; e.g., first name and birth date are preferably highly weighted since these should almost never change, whereas telephone number and email address are lowly weighted because they can change frequently. Alternatively, the identity verification module may not take into consideration information that is likely to change, such as phone number and email address. The aggregate score is also normalized and standardized into the range value as described above. For example, the scores may be aggregated as $$I_{online} = \frac{\sum_{k=1}^{n} C_k \times I_k}{\sum_{k=1}^{n} C_k} = \frac{C_1 \times I_1 + C_2 \times I_2 + C_3 \times I_3}{C_1 + C_2 + C_3}$$

where $C_1$, $C_2$, and $C_3$ are weights applied to the scores for different fields (e.g., name, date of birth, email address, etc) and $I_1$, $I_2$, and $I_3$ are online identity scores for different fields (e.g., name, date of birth, email address, etc).

The offline identity verification module 209 uses offline information to determine the veracity of a user's identity. For example, the offline identity verification module may use information extracted from an image of user's driver license and compare them to the information provided by the user in the user profile. In one embodiment, the offline identity verification module 209 prompts the user to take a picture of their driver's license using a webcam, smartphone, or other network-enabled device, with the picture being transmitted to the offline identity verification module 209. The offline identity verification module extracts the information from the image provided by the user and compares it to the information available in the user profile store 201. In some embodiments, the offline identity verification module 209 may perform optical character recognition (OCR) to the image provided by the user to extract the information needed. If the extracted information from the driver's license matches the stored information, this indicates that the information provided by the user is correct. In other words, the fact that the user was in possession of a driver's license that accurately matches the stored information supports the inference that the user is who he claim he is.

Other offline information that can be used to determine the veracity of the user's identity is credit card information, bank account information, and the like.

The online identity verification and the offline identity verification may be performed by the online system or each identity verification step may be performed by a different system operated by different entities. In some embodiments, the online system redirects the user to a third party service provider that collects this data and sends it to the online system 111. This way, if the user does not trust sharing sensitive information (such as social security numbers, driver license numbers, and/or passports) with the online system, the process can be facilitated using the third party provider (e.g., Jumio). For example, the user may be redirected to the third party provider and the third party provider may request users for their offline identification (e.g., an image of their driver's license). The third party provider may then extract relevant information from the offline identification and send the information to the offline identity verification module 209. In one embodiment, the online system 111 or the third party service provider may further analyze the image of the driver license or any government issued identification for security features to determine if the document has not been counterfeited.

In some embodiments, information included in a credit report may also be used to determine whether the user is who the user claims to be. For example, questions such as "in which of these addresses you have never lived," or "which company were you employed at during 2000" can be asked to the user, based on information in the credit report. Then a score based on the answers that the user gave can be determined. In one embodiment, this is also facilitated by a third party service provider, such as a credit bureau (e.g., Experian, Equifax, TransUnion, etc).

In one embodiment, only the offline verification module 209 is used to verify the identity of a user and once the identity of the user is verified, the online identity verification module 207 is used to verify that each online user account provided by the user is owned by the user.

Figure 3:
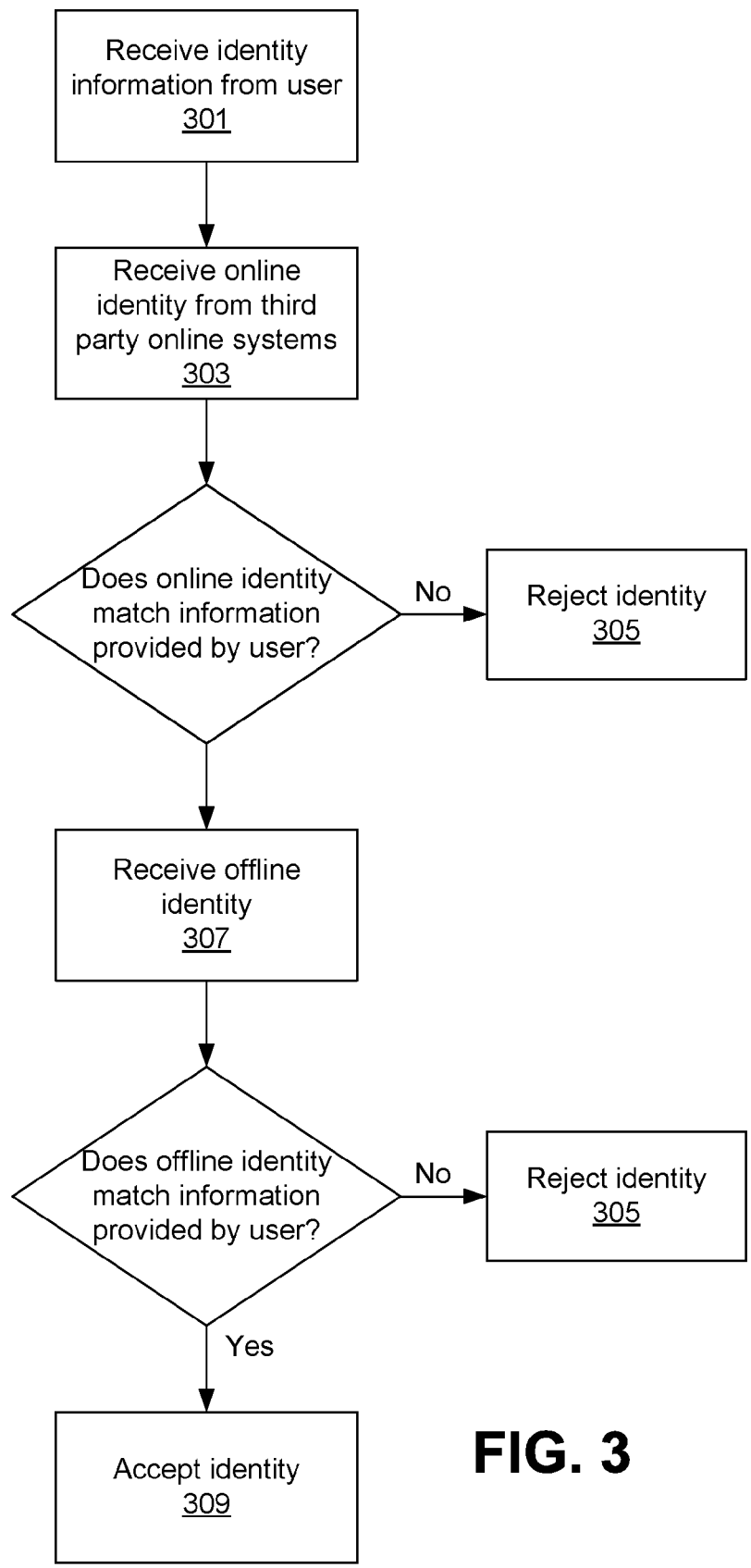
FIG. 3 is a flow diagram of a method for verifying the identity of a user of an online system, in accordance with an embodiment of the invention.

Referring now to FIG. 3, illustrated is a flow diagram of a method for verifying the identity of a user of an online system. Information about a user identity is received 301 by the online system 111 from a user's client device 101. The information may be received from the user at the time the user 103 creates a user account or a user profile in the online system 111, through an account registration page or user profile page.

Online identity information is received 303 from one or more third party online systems 121. In some embodiments, users link their third party online system 121 user accounts to the online system 111 user account by granting permission to the online system 111 to access their user profile information in the third party online systems 121. The online identity is compared to the identity information provided by the user. If the online identity does not match the identity provided by the user, the identity is rejected 305.

Offline identity information is received 307 by the online system 111. Offline identity may take the form of an image of driver license, a passport, a government issued identification, and the like. The offline identity information is extracted from the image and is then compared to the identity provided by the user. If the offline identity does not match the identity provided by the user, then the identity is rejected 305. Otherwise, if the offline identity and the online identity match with the identity provided by the user, the identity is accepted 309.

The steps illustrated in the flow diagram of FIG. 3 may be performed in a different order than the one depicted in FIG. 3. For instance, the offline identity may be received and verified before receiving and verifying the online identity of the user. In another example, both the online identity and the offline identity are received and verified substantially in parallel. Moreover, the online system may determine to skip one or more of the steps illustrated in the flow diagram of FIG. 3. For example, the online system may determine not to perform the online identity verification and only verify the offline identity of the user.

Trustworthiness Verification

After the identity of the user has been verified, and each online user account provided by the user is determined to be owned by the user, the trustworthiness of the user may be determined. Determining the trustworthiness of a particular user increases the confidence of other users of an online system to interact with that particular user. In particular, users of an online system 111 that involves an offline user interaction (e.g., sharing a ride, or offering accommodation to another user) may feel safer to perform the offline interaction knowing that other users' trustworthiness has been verified.

The trustworthiness verification module 205 verifies the trustworthiness of users 103 of the online system 111. In some embodiments, the trustworthiness is represented as a score (e.g., a score from 1 to 10). In one embodiment, trustworthiness is determined when a user creates a user account. In other embodiments, since trustworthiness of a user may change over time, trustworthiness may be determined every predetermined about of time (e.g., every month). In other embodiments, trustworthiness is determined on the fly every time the trustworthiness score is needed (e.g., each time the user performs a transaction).

In some embodiments trustworthiness is based on the user's online activity and offline activity. In some embodiments, the online activity trustworthiness score is based on the date the third party online system 121 user profile was created, the date the third party online system 121 user profile was updated, and the activity of the user on the third party online system 121. In other embodiments, other criteria, such as the number of devices the user has linked to the user account in the third party online system 121 may also be used to determine the online trustworthiness score.

In one embodiment, the online trustworthiness score depends on how long the user has had the third party online system user account for. The longer the user has had the account for, the higher the trustworthiness score associated with that account.

The online trustworthiness score may also depend on the amount of time since some information from the user profile has been updated, or the frequency the user updates certain information of the user profile. For example, a recent change in the name or date of birth may result in a low trustworthiness score. For instance, the score may be determined based on a linear function if the information in the user profile was updated within a threshold amount of time, or be a constant value if the information was updated more than a threshold amount of time in the past. In one embodiment, the score is determined as $$T = \frac{t_{months}}{12} \quad t_{months} < 12$$
$$T = 1 \quad t_{months} > 12$$

where T is a trustworthiness score based on a third party user account, $t_{months}$ is the number of months since the information in the third party user account has been updated. Other types of function, such as quadratic functions, logarithmic functions and the like may be used to determine the trustworthiness score.

The online trustworthiness score may also depend on the user activity in the third party online system 121 and/or in the online system 111. For instance certain patterns may be inferred from the user's activity and a trustworthiness score may be determined based on the inferred activity pattern. For example, the browsing behavior of the user can be analyzed and a score may be given based on the browsing behavior of the user.

For example, if a male user only interacts with female users in a social networking system, or a male user only asks questions about accommodations offered by female hosts in an accommodation reservation system, it might result in a low trustworthiness score.

In one embodiment, a machine learning algorithm may be used to predict the trustworthiness of a user based on their online activity. The trustworthiness score determination may be based on all the online available information for a user. In some embodiments, the machine learning algorithm is trained on available information from every user of the online system 111. In other embodiments, the machine learning algorithm is trained on available information for users that have received comments from other users of the online system 111. In yet other embodiments, the machine learning algorithm is trained on available information for users that have been using the online system 111 for at least a threshold amount of time. For example, in an accommodation reservation system, a host may provide a feedback trustworthiness score (e.g., from 0 stars to 5 stars) for users that stay at their accommodation based on the host's observations. Similarly, in a rideshare system, a driver may provide a feedback trustworthiness score for users that carpooled with the driver. Then, the online behavioral information that is available from the user (e.g., browsing patterns, social networking system interaction patterns, etc) is entered together with the feedback trustworthiness into the machine learner as training sets.

User comments from other users can also be used to determine the online trustworthiness score. For example, if a user always receives good comments from hosts after staying at accommodations offered by those hosts, then this can increase the trustworthiness score determined by the trustworthiness verification module 205. For instance, a sentiment analysis or opinion mining may be performed on the text from comments written by other users. Additionally, a quantitative analysis may be performed on numerical responses (e.g., scores given by other users). The sentiment analysis and/or quantitative analysis from different users may be aggregated and/or weighted based on recency. Recent comments may be weighed higher than older comment. In some embodiments, comments may also be weighed using other factors such as the trustworthiness of the user leaving the comment and the like.

In some embodiments, if a specific user has multiple accounts in different third party online systems, each user account may get its own online trustworthiness score based on the information available in each of the user profiles, and the scores may be aggregated to obtain an overall online trustworthiness score. For instance, if a user has a social networking system user account, a professional networking system account, and a blog account, a different score may be determined for each of the accounts the user owns (e.g., the social networking system account might get a trustworthiness score $T_1$, the a professional networking system account might get a trustworthiness score $T_2$, and the blog account might get a trustworthiness score $T_3$). Then the scores might be aggregated as $$T_{online} = \frac{\sum_{k=1}^{n} C_k \times T_k}{\sum_{k=1}^{n} C_k} = \frac{C_1 \times T_1 + C_2 \times T_2 + C_3 \times T_3}{C_1 + C_2 + C_3}$$

Where $C_1$, $C_2$, and $C_3$ are weights applied to the scores for different third party online systems 121. For example, a social networking system trustworthiness score may have a higher weight than an email trustworthiness score.

In one embodiment, a user's connections in a social networking system may also influence the user's trustworthiness score. As used herein, a user's connection is another user in a social networking system that has established a relationship with the user in the social networking system (e.g., a friendship relationship). A connection may be established at different levels. For example in a first level connection, the two users have a direct relationship with each other. In a second level connection, the two users do not have a direct connection with each other, but both users have establish a direct relationship with a third user (e.g., mutual friend).

For instance, the trustworthiness score for each other user a given user is connected to can be determined, weighted and aggregated to the current user's trustworthiness score. In one embodiment, only first level connections are considered for a user's trustworthiness score. In other embodiments second level connections may also be considered for a user's trustworthiness score. In one embodiment, the trustworthiness scores of a user's connections are weighted according to the level of the connection with the user (i.e., first level connections may have one weight, and second level connections may have a different weight, lower than the weight of the first level connections). In another embodiment, the trustworthiness scores of user's connections are weighed according to the connection's affinity with the user. Connections with higher affinity might be assigned a higher weight than connections with lower affinities.

The offline trustworthiness score may be based on information available in different databases, such as a sex offender database, criminal records database, and the like. In some embodiments, the offline trustworthiness score is based on age of the information in these databases. For example, the offline trustworthiness verification module 213 may only take into consideration entries that are at most a predetermined amount of time old (e.g., entries that are less than 5 years old). In another example, the offline trustworthiness verification module 213 may weigh the scores of each entry based on how old those entries are.

In some embodiments, each type of entry may be assigned a score. For example, a misdemeanor may be assigned a score of −0.5, while a felony may be assigned a score of −1. These scores may then be aggregated to obtain an overall offline trustworthiness score. Alternatively, scores may be assigned at a different granularity. For instance, each type of felony (e.g., murder, rape, manslaughter, treason, kidnapping, etc) may be assigned a different score. If an entry is found for a user, the entry may negatively impact the offline trustworthiness score of the user. In some embodiments, a machine learning algorithm may be used to determine the trustworthiness of users with entries in the different databases. For example, a machine learned model may be generated based on past experiences with users having entries in the different databases. For instance, after a user stayed at an accommodation offered by a host, the host may indicate whether the user is trustworthy, this information along with the information found in the different databases may be entered into a machine learner to generate model having the types of entries of the different databases as input and a determination whether the user is trustworthy as the output. In one embodiment, if no entries are found, the offline trustworthiness score may assign a score of +1 to the user. In other embodiments, if no entries are found, the offline trustworthiness score may assign a neutral score to the user (e.g., a score of 0). In one embodiment, the individual offline trustworthiness scores from each database used may be aggregated in the same way the individual online trustworthiness scores are aggregated. For instance, the individual offline trustworthiness scores ($T_k$) may be aggregated as $$T_{offline} = \frac{\sum_{k=1}^{n} C_k \times T_k}{\sum_{k=1}^{n} C_k}$$

Where $C_k$ is a weight assigned to each individual offline trustworthiness score. In some embodiments, the weights ($C_k$) may depend on the type of entry the individual trustworthiness score is based on and/or the time stamp of the entry the individual trustworthiness score is based on.

In other embodiments, certain entries in the information available about the user may cause the user to get an automatic trustworthiness rejection. For instance, if the user is a known sex offender or has a felony in their criminal records, this may cause the user to get an automatic trustworthiness rejection (e.g., a trustworthiness score of −1 in the case the trustworthiness score ranges from −1 to +1).

In some embodiments, other information such as education history may also be used to determine the offline trustworthiness score. For instance, each degree may positively influence the offline trustworthiness score of a user. For example, a doctorate degree may be assigned a score of +1, a master's degree may be assigned a score of +0.8, a bachelor's degree may be assigned a score of +0.5, and so on. These scores may be also aggregated with the other trustworthiness score to determine the user's overall offline trustworthiness score.

Figure 4:
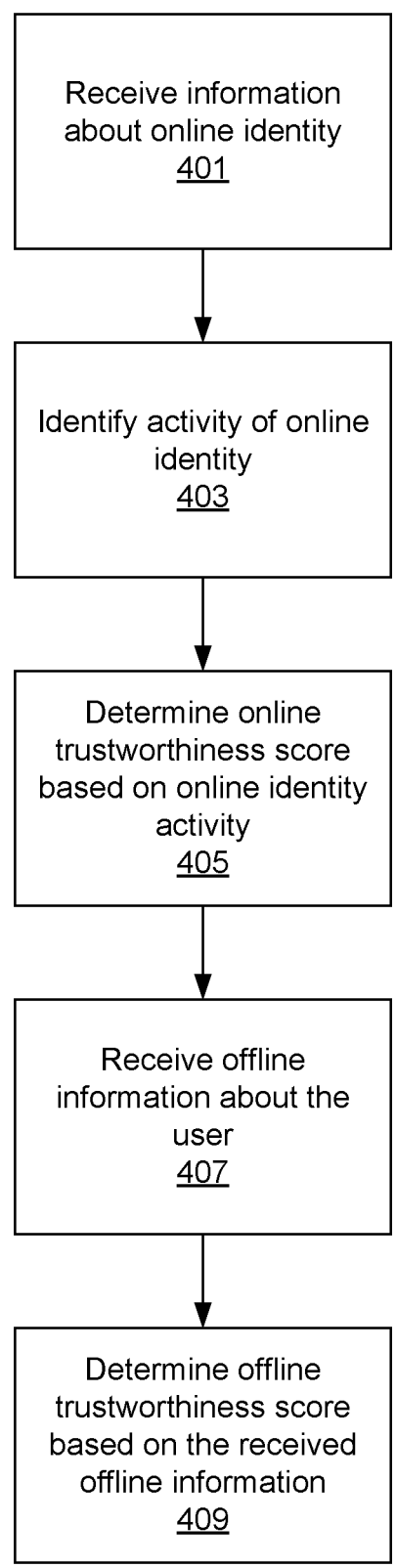
FIG. 4 is a flow diagram of a method for verifying the trustworthiness of a user of an online system, in accordance with one embodiment of the invention.

Now referring to FIG. 4, illustrated is a flow diagram of a method for verifying the trustworthiness of a user of an online system 111. The online trustworthiness verification module 211 receives 401 information about a user's online identity from a third party online system 121 and identifies 403 the activity of the user in the third party online system 121. Based on the received information and the identified online activity, an online trustworthiness score is computed 405.

The offline trustworthiness verification module 213 receives 407 offline information about the user and determines 409 an offline trustworthiness score based on the received offline information. In some embodiments, the online trustworthiness score and the offline trustworthiness score may be aggregated to generate an overall trustworthiness score.

Additional Considerations

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method, comprising:
   receiving, from a user, by a computer, information about a first online identity of the user of a first online system, the first online identity including a first name and a last name of the user;
   receiving from the user, credentials for an account of the user in a third party online system;
   sending a request to the third party online system for information about a second online identity of the user, the request including the credentials, the third party online system different than the first online system;
   receiving information about the second online identity of the user from the third party online system;
   determining a first measure of difference between the first online identity and the second online identity; and
   responsive to the first measure of difference exceeding a threshold:
      notifying the user that the information about the first online identity of the user does not match the second online identity;
   receiving offline information about an offline identity of the user, the offline information including a first name and a last name, extracted from at least one of a driver license of the user, a passport of the user, and a government issued identification of the user;
   determining a second measure of difference between a text of the first name and last name in the first online identity and text of the first name and last name in the offline identity; and
   responsive to the second measure of difference exceeding the threshold:
      notifying the user that the information about the first online identity of the user does not match the offline identity of the user;
   responsive to first and second measure of difference not exceeding the threshold:
      verifying the first online identity.

2. The computer implemented method of claim 1, wherein the information about the first online identity of the user further comprises at least one of: a date of birth, and an address.

3. The computer implemented method of claim 1, wherein the second online identity includes a first name and a last name used with the account of the user in the third party online system, and wherein determining a first measure of difference between the first online identity and the second online identity comprises:
   determining a measure of difference between the text of the first name and the last name in the first online identity and the text of the first name and last name in the second online identity.

4. The computer implemented method of claim 3, wherein determining a measure of difference between text of the first name and last name in the first online identity and text of the first name and last name in the second online identity comprises:
   calculating a confidence score based on an edit distance between the first name from the first online identity and the first name from the second online identity and an edit distance between the last name from the first online identity and the last name from the second online identity.

5. The computer implemented method of claim 4 wherein the measure of difference is the confidence score.

6. The computer implemented method of claim 1, wherein:
   the information about the first online identity of the user further comprises a profile picture, and
   determining whether the first online identity is different than the second online identity further comprises:
      comparing the profile picture of the information about the first online identity of the user with a profile picture from the information about the second online identity of the user received from one or more third party online system.

7. The computer implemented method of claim 1, wherein receiving offline information about the offline identity of the user comprises:
receiving an image of at least one document; and
extracting the offline information about the identity of the user from the image of the at least one document.

8. A system comprising:
a hardware processor; and
a computer readable medium configured to store instructions, the instructions when executed by a processor cause the processor to:
receive, from a user, information about a first online identity of a user of the first online system, the first online identity including a first name and a last name of the user;
receive from the user, credentials for an account of the user in a third party online system;
send a request to the third party online system for information about a second online identity of the user, the request including the credentials, the third party online system different than the first online system;
receive information about the second online identity of the user from the third party online system;
determine a first measure of difference between the first online identity and the second online;
responsive to the first measure of difference exceeding a threshold:
notify the user that the information about the first online identity of the user does not match the second online identity,
receive offline information about an offline identity of the user, the offline information including a first name and a last name, extracted from at least one of a driver license of the user, a passport of the user, and a government issued identification of the user;
determine a second measure of difference between text of the first name and last name in the first online identity and text of the first name and last name in the offline identity; and
responsive to the second measure of difference exceeding the threshold:
notify the user that the information about the first online identity of the user does not match the offline identity of the user;
responsive to first and second measure of difference not exceeding the threshold:
verify the first online identity.

9. The system of claim 8, wherein the information about the identity of the user further comprises at least one of: a date of birth, and an address.

10. The system of claim 8, wherein the second online identity includes a first name and a last name used with the account of the user in the third party online system, and wherein the instructions for determining a first measure of difference between the first online identity and the second online identity cause the processor to:
determine a measure of difference between the text of the first name and the last name in the first online identity and the text of the first name and last name in the second online identity.

11. The system of claim 10, wherein the instructions for determining a measure of difference between text of the first name and last name in the first online identity and text of the first name and last name in the second online identity cause the processor to:
calculate a confidence score based on an edit distance between the first name from the first online identity and the first name from the second online identity and an edit distance between the last name from the first online identity and the last name from the second online identity.

12. The system of claim 11 wherein the measure of difference is the confidence score.

13. The system of 8, wherein:
the information about the first online identity of the user further comprises a profile picture, and
wherein the instruction for determining whether the first online identity is different than the second online identity further cause the processor to:
compare the profile picture of the information about the first online identity of the user with a profile picture from the information about the second online identity of the user received from one or more third party online system.

14. The system of claim 8, wherein the instructions for receiving offline information about the offline identity of the user cause the processor to:
receive an image of the at least one document; and
extract the offline information about the identity of the user from the image of the at least one document.

15. A non-transitory computer readable storage medium configured to store instructions, the instructions when executed by a processor, cause the processor to:
receive, from a user information about a first online identity of the user of a first online system, the first online identity including a first name and a last name of the user;
receive from the user, credentials for an account of the user in a third party online system;
send a request to the third party online system for information about a second online identity of the user, the request including the credentials, the third party online system different than the first online system;
receive information about the second online identity of the user from the third party online system;
determine a first measure of difference between the first online identity and the second online identity;
responsive to the measure of difference exceeding a threshold:
notify the user that the information about the first online identity of the user does not match the second online identity;
receive offline information about an offline identity of the user, the offline information including a first name and a last name, extracted from at least one of a driver license of the user, a passport of the user, and a government issued identification of the user;
determine a second measure of difference between text of the first name and last name in the first online identity and text of the first name and last name in the offline identity; and
responsive to the second measure of difference exceeding the threshold:
notify the user that the information about the first online identity of the user does not match the offline identity of the user;
responsive to first and second measure of difference not exceeding the threshold:
verify the first online identity.

16. The non-transitory computer readable storage medium of claim 15, wherein the information about the identity of the user further comprises at least one of: a date of birth, and an address.

17. The non-transitory computer readable storage medium of claim 15, wherein the second online identity includes a first name and a last name used with the account of the user in the third party online system, and wherein the instructions for determining a first measure of difference between the first online identity and the second online identity cause the processor to:

determine a measure of difference between the text of the first name and the last name in the first online identity and the text of the first name and last name in the second online identity.

18. The non-transitory computer readable storage medium of claim 17, wherein the instructions for determining a measure of difference between text of the first name and the last name in the first online identity and text of the first name and last name in the second online identity cause the processor to:

calculate a confidence score based on an edit distance between the first name from the first online identity and the first name from the second online identity and an edit distance between the last name from the first online identity and the last name from the second online identity.

19. The non-transitory computer readable storage medium of claim 18 wherein the measure of difference is the confidence score.

20. The non-transitory computer readable storage medium of claim 15, wherein the information about the first online identity of the user further comprises a profile picture, and wherein the instructions for determining whether the first online identity is different than the second online identity cause the processor to:

compare the profile picture of the information about the first online identity of the user with a profile picture from the information about the second online identity of the user received from one or more third party online system.

* * * * *